(12) United States Patent
Gajic

(10) Patent No.: US 8,965,921 B2
(45) Date of Patent: Feb. 24, 2015

(54) DATA MANAGEMENT AND INDEXING ACROSS A DISTRIBUTED DATABASE

(75) Inventor: Natasha Gajic, San Antonio, TX (US)

(73) Assignee: Rackspace US, Inc., San Antonio, TX (US)

( * ) Notice: Subject to any disclaimer, the term of this patent is extended or adjusted under 35 U.S.C. 154(b) by 0 days.

(21) Appl. No.: 13/489,717

(22) Filed: Jun. 6, 2012

(65) Prior Publication Data

US 2013/0332484 A1  Dec. 12, 2013

(51) Int. Cl.
*G06F 17/30* (2006.01)

(52) U.S. Cl.
USPC ............ 707/770; 707/802; 707/E17.002; 707/966; 709/201

(58) Field of Classification Search
CPC ............ G06F 17/30864; G06F 17/30067; G06F 17/30312; G06F 17/30575; G06Q 30/02; Y10S 707/99933
USPC ............ 707/770, 802, 922, E17.002, 999.01, 707/966; 709/201
See application file for complete search history.

(56) References Cited

U.S. PATENT DOCUMENTS

| | | | |
|---|---|---|---|
| 5,727,197 A * | 3/1998 | Burgess et al. | 1/1 |
| 6,047,323 A * | 4/2000 | Krause | 709/227 |
| 6,049,804 A * | 4/2000 | Burgess et al. | 1/1 |
| 6,243,744 B1 * | 6/2001 | Snaman et al. | 709/220 |
| 6,249,802 B1 * | 6/2001 | Richardson et al. | 709/200 |
| 6,523,036 B1 * | 2/2003 | Hickman et al. | 707/704 |
| 6,748,429 B1 * | 6/2004 | Talluri et al. | 709/221 |
| 6,829,610 B1 * | 12/2004 | Hickman et al. | 1/1 |
| 7,024,483 B2 * | 4/2006 | Dinker et al. | 709/227 |
| 7,146,365 B2 * | 12/2006 | Allen et al. | 1/1 |
| 7,240,064 B2 * | 7/2007 | Risvik et al. | 707/709 |
| 7,266,545 B2 * | 9/2007 | Bergman et al. | 707/706 |
| 7,502,776 B2 * | 3/2009 | Venkatesan et al. | 1/1 |
| 7,565,151 B2 * | 7/2009 | Sano | 455/452.1 |
| 7,664,847 B2 * | 2/2010 | Colrain et al. | 709/224 |
| 7,702,640 B1 * | 4/2010 | Vermeulen et al. | 707/999.1 |
| 7,748,047 B2 * | 6/2010 | O'Neill | 726/29 |
| 7,788,243 B2 * | 8/2010 | Pasupuleti et al. | 707/704 |
| 7,809,763 B2 * | 10/2010 | Nori et al. | 707/802 |
| 7,937,377 B2 * | 5/2011 | Wilding et al. | 707/704 |
| 8,015,293 B2 * | 9/2011 | Schaedler et al. | 709/227 |
| 8,117,488 B2 * | 2/2012 | Chan et al. | 714/4.3 |
| 8,156,082 B2 * | 4/2012 | Srivastava et al. | 707/674 |
| 8,190,613 B2 * | 5/2012 | Takuma et al. | 707/741 |
| 8,301,589 B2 * | 10/2012 | Sen et al. | 707/610 |

(Continued)

OTHER PUBLICATIONS

Guha et al., "CURE: An Efficient Clustering Algorithm for Large Databases", In Proceedings of the 1998 ACM SIGMOD International Conference on Management of Data, pp. 73-84, 1998.*

(Continued)

*Primary Examiner* — Phuong Thao Cao
(74) *Attorney, Agent, or Firm* — Haynes and Boone, LLP

(57) ABSTRACT

In one embodiment, a distributed database system supporting flexible configuration of data clusters is disclosed. The system includes a cluster manager, an index, and a dataset distributed over one or more database clusters. Where the nodes of the clusters may report ownership of a particular range, the index contains an alternate range. The cluster manager receives requests to access a range of data within database and queries the index to determine the appropriate nodes and/or clusters with which to connect. The cluster manager then directs the requestor to connect to the specified nodes and/or clusters.

10 Claims, 11 Drawing Sheets

(56) References Cited

U.S. PATENT DOCUMENTS

| | | | | |
|---|---|---|---|---|
| 8,316,110 | B1* | 11/2012 | Deshmukh et al. | 709/220 |
| 8,391,295 | B2* | 3/2013 | Colrain et al. | 370/400 |
| 8,412,700 | B2* | 4/2013 | Day et al. | 707/715 |
| 8,412,810 | B1* | 4/2013 | Tompkins | 709/223 |
| 8,499,025 | B2* | 7/2013 | Howard | 709/201 |
| 8,595,268 | B2* | 11/2013 | Shoolman et al. | 707/803 |
| 2001/0032271 | A1* | 10/2001 | Allen | 709/239 |
| 2002/0198883 | A1* | 12/2002 | Nishizawa et al. | 707/10 |
| 2003/0033300 | A1* | 2/2003 | Bergman et al. | 707/5 |
| 2003/0126284 | A1* | 7/2003 | Houston et al. | 709/238 |
| 2003/0154202 | A1* | 8/2003 | Dinker et al. | 707/100 |
| 2003/0204786 | A1* | 10/2003 | Dinker et al. | 714/43 |
| 2004/0199486 | A1* | 10/2004 | Gopinath et al. | 707/1 |
| 2004/0243618 | A1* | 12/2004 | Malaney et al. | 707/102 |
| 2005/0038789 | A1* | 2/2005 | Chidambaran et al. | 707/10 |
| 2005/0038833 | A1* | 2/2005 | Colrain et al. | 707/203 |
| 2005/0038834 | A1* | 2/2005 | Souder et al. | 707/203 |
| 2005/0038848 | A1* | 2/2005 | Kaluskar et al. | 709/201 |
| 2005/0038849 | A1* | 2/2005 | Kaluskar et al. | 709/203 |
| 2005/0080883 | A1* | 4/2005 | Nurminen et al. | 709/221 |
| 2005/0169179 | A1* | 8/2005 | Antal et al. | 370/231 |
| 2005/0289388 | A1* | 12/2005 | Black-Ziegelbein et al. | 714/7 |
| 2006/0184535 | A1* | 8/2006 | Kaluskar et al. | 707/10 |
| 2007/0130154 | A1* | 6/2007 | Venkatesan et al. | 707/10 |
| 2007/0173258 | A1* | 7/2007 | Sano | 455/445 |
| 2007/0198684 | A1* | 8/2007 | Mizushima | 709/223 |
| 2007/0276833 | A1* | 11/2007 | Sen et al. | 707/8 |
| 2008/0319987 | A1* | 12/2008 | Takuma et al. | 707/5 |
| 2009/0043887 | A1* | 2/2009 | Coekaerts | 709/224 |
| 2009/0048927 | A1 | 2/2009 | Gross | |
| 2009/0147698 | A1* | 6/2009 | Potvin | 370/254 |
| 2009/0198807 | A1* | 8/2009 | Bailey et al. | 709/223 |
| 2009/0210429 | A1* | 8/2009 | Agrawal et al. | 707/10 |
| 2009/0313436 | A1* | 12/2009 | Krishnaprasad et al. | 711/129 |
| 2010/0023564 | A1* | 1/2010 | Yerneni et al. | 707/204 |
| 2010/0030995 | A1* | 2/2010 | Wang et al. | 711/173 |
| 2010/0036883 | A1* | 2/2010 | Valencia-Campo et al. | 707/104.1 |
| 2010/0138223 | A1* | 6/2010 | Koshinaka | 704/245 |
| 2010/0161617 | A1* | 6/2010 | Cao et al. | 707/741 |
| 2010/0185719 | A1* | 7/2010 | Howard | 709/201 |
| 2010/0241629 | A1* | 9/2010 | Tatemura et al. | 707/741 |
| 2010/0241828 | A1* | 9/2010 | Yu et al. | 712/30 |
| 2011/0019591 | A1* | 1/2011 | O'Neal et al. | 370/256 |
| 2011/0035363 | A1* | 2/2011 | Warshawsky | 707/688 |
| 2011/0099412 | A1* | 4/2011 | Chan et al. | 714/2 |
| 2011/0276579 | A1* | 11/2011 | Colrain et al. | 707/756 |
| 2012/0005280 | A1 | 1/2012 | Chakra et al. | |
| 2012/0036146 | A1* | 2/2012 | Annapragada | 707/764 |
| 2012/0042055 | A1* | 2/2012 | Agarwala et al. | 709/220 |
| 2012/0066363 | A1* | 3/2012 | Somogyi et al. | 709/223 |
| 2012/0078850 | A1* | 3/2012 | Bryant et al. | 707/652 |
| 2012/0158800 | A1* | 6/2012 | Peters et al. | 707/812 |
| 2012/0191702 | A1* | 7/2012 | Musial et al. | 707/719 |
| 2012/0210047 | A1* | 8/2012 | Peters et al. | 711/103 |
| 2012/0239814 | A1* | 9/2012 | Mueller et al. | 709/226 |
| 2012/0254175 | A1* | 10/2012 | Horowitz et al. | 707/737 |
| 2012/0271795 | A1* | 10/2012 | Rao et al. | 707/613 |
| 2012/0290714 | A1* | 11/2012 | Cohen | 709/224 |
| 2013/0007504 | A1* | 1/2013 | Bodke et al. | 714/4.2 |
| 2013/0036272 | A1* | 2/2013 | Nelson | 711/147 |
| 2013/0054600 | A1* | 2/2013 | Somogyi et al. | 707/737 |
| 2013/0166502 | A1* | 6/2013 | Walkauskas | 707/610 |
| 2013/0185337 | A1* | 7/2013 | Lipcon | 707/813 |
| 2013/0297613 | A1* | 11/2013 | Yu | 707/741 |
| 2013/0339567 | A1* | 12/2013 | Carpentier et al. | 711/4 |

OTHER PUBLICATIONS

Chang et al., "Bigtable: A Distributed Storage System for Structured Data", ACM Transactions on Computer Systems, vol. 26, No. 2, Article 4, 26 pages, Jun. 2008.*

Akal et al., "OLAP Query Evaluation in a Database Cluster: A Performance Study on Intra-Query Parallelism", ADBIS 2002, LNCS 2435, pp. 218-231, 2002.*

PCT International Search Report issued in PCT/US2013/044547 on Oct. 7, 2013, 4 pages.

* cited by examiner

DATA MANAGEMENT AND INDEXING ACROSS A DISTRIBUTED DATABASE

BACKGROUND

The present disclosure relates generally to cloud computing and more particularly to a scalable distributed data management system utilizing load-balancing techniques including data distribution and distributed indexing to leverage a cloud computing system.

Cloud computing services can provide computational capacity, data access, networking/routing and storage services via a large pool of shared resources operated by a cloud computing provider. Because the computing resources are delivered over a network, cloud computing is location-independent computing, with all resources being provided to end-users on demand with control of the physical resources separated from control of the computing resources.

Cloud computing is a model for enabling access to a shared collection of computing resources—networks for transfer, servers for storage, and applications or services for completing work. More specifically, the term "cloud computing" describes a consumption and delivery model for IT services based on the Internet, and it typically involves over-the-Internet provisioning of dynamically scalable and often virtualized resources. This frequently takes the form of web-based tools or applications that users can access and use through a web browser as if it was a program installed locally on their own computer. Details are abstracted from consumers, who no longer have need for expertise in, or control over, the technology infrastructure "in the cloud" that supports them. Most cloud computing infrastructures consist of services delivered through common centers and built on servers. Clouds often appear as single points of access for consumers' computing needs, and do not require end-user knowledge of the physical location and configuration of the system that delivers the services.

The utility model of cloud computing is useful because many of the computers in place in data centers today are underutilized in computing power and networking bandwidth. People may briefly need a large amount of computing capacity to complete a computation, for example, but may not need the computing power once the computation is done. The cloud computing utility model provides computing resources on an on-demand basis with the flexibility to redistribute resources automatically or with little intervention.

The flexibility of the cloud lends itself to a number of solutions for storing, retrieving, and analyzing large datasets. Relational database management systems (RDBMS) are data management systems designed to handle large amounts of interrelated data. RDBMS organize related data into tables optimized for rapid access of data while maintaining core requirements of atomicity (the requirement that a transaction be entirely successful and that changes made by a partially successful transaction be reverted), consistency (the requirement that transactions must not violate specified database consistency checks), isolation (the requirement that no transaction can interfere with another transaction), and durability (the requirement that committed transactions be written to a permanent location instead of, for example, a buffer). Many RDMBS protocols support splitting large amounts of data over multiple computing nodes. In a horizontally distributed environment, transaction data may be stored among multiple nodes, whereas in a vertically distributed environment, the data may be replicated at multiple nodes. As can be seen, the task of achieving reasonable query performance in a distributed network while maintaining atomicity, consistency, isolation and durability is non-trivial. Challenges inherent in the task have necessitated tradeoffs that make distributed RDBMS suit some applications better than others.

Due in part to these tradeoffs, a number of NoSQL-type systems have emerged. These systems soften the requirements of a relational database in exchange for increased performance. Abandoning certain RDBMS tenets has the ability to pay dividends, particularly in a distributed environment. For example, a NoSQL system may employ an eventual consistency model to improve data transactions. Under an eventual consistency model, transaction results will propagate to appropriate data locations eventually as opposed to arriving at a guaranteed time. Propagating results and synchronizing data requires considerable overhead, and deprioritizing certain writes can relieve burden on the hardware including storage element and the supporting network. It can also improve query response time.

Based on the intended use and associated design considerations, NoSQL systems utilize a variety of different mechanisms to distribute data over a set of compute nodes. These mechanisms lead to partitioning rules such as a minimum level of granularity when partitioning data between computing systems. On the other hand, cloud computing is uniquely suited to rapid and dynamic creation, reconfiguration, and destruction of computing "systems." Data management architectures with greater flexibility and capable of efficient balancing and scaling can better leverage the ephemeral resources available within the cloud. Accordingly, it is desirable to provide a better-functioning data management system capable of maximizing cloud-computing resources while providing improved query efficiency and data capacity.

DETAILED DESCRIPTION

The following disclosure has reference to database structure and management in a distributed computing environment such as a cloud architecture.

Figure 1:
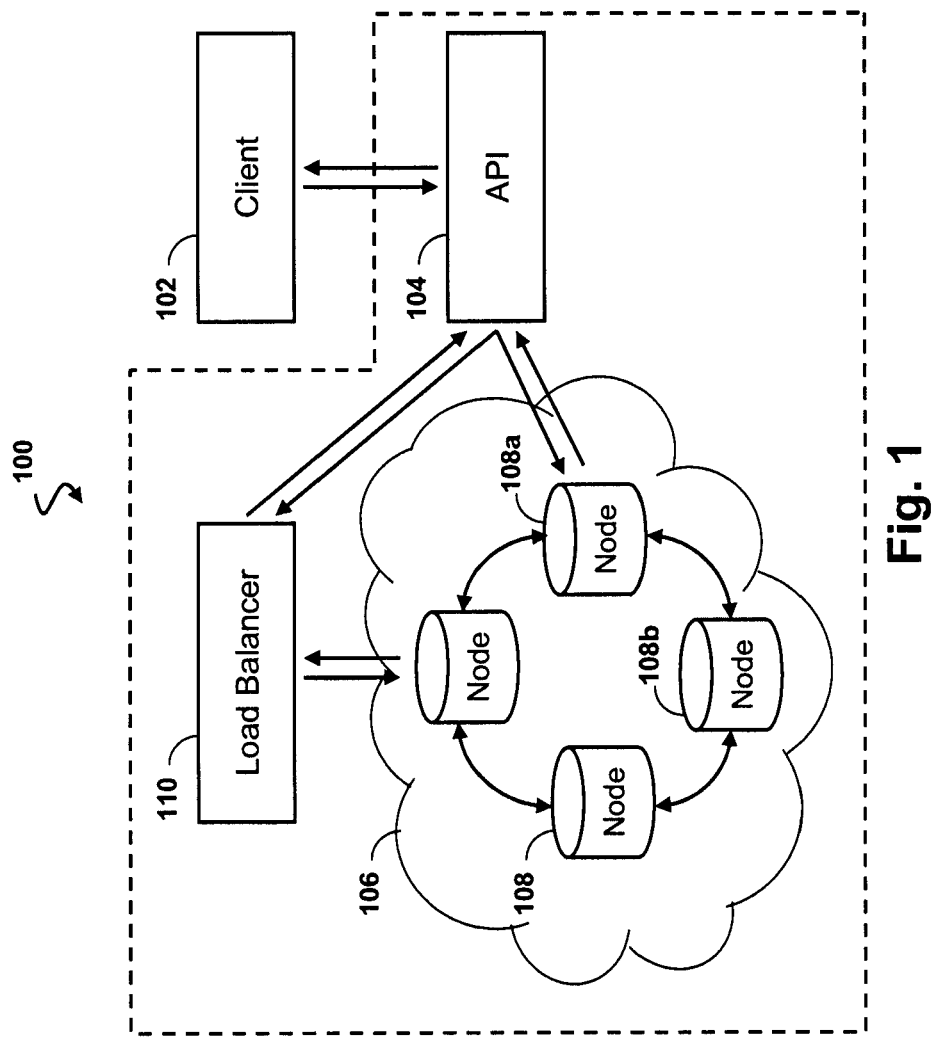
FIG. 1 is a schematic diagram illustrating a database system according to aspects of the present disclosure.

FIG. 1 is a schematic diagram illustrating a database system 100 according to aspects of the present disclosure. An external client 102 communicates with an application programming interface (API) 104 within the system 100, via a network such as, for example, a Transport Control Protocol/Internet Protocol (TCP/IP) network (e.g., the Internet.) The API 104 is logical construct that allows the client 102 to pass data and commands without requiring the client 102 to have detailed knowledge about the configuration of the system 100 behind the API 104. In some embodiments, the API 104 includes a specification of interface commands supported by system components such as the database cluster 106. In the most straightforward embodiments, client instructions formatted according to the API 104 specification can be forwarded by the API 104 without translation or modification. In various other embodiments, the API 104 modifies or verifies commands to and from the client before passing them along. For example, an API may translate client commands based on a client command specification and a system command specification. Client commands meeting the client specification may be translated into analogous system commands and forwarded for execution and vice versa. In flexible computing environments, the API 104 may include more than one interface command format for either the client 102 or the system 100. Based on a client or system identifier, the API 104 may select the proper specification for translation.

The API 104 may also perform one or more gatekeeping functions. Under its gatekeeping role, the API 104 may perform permission verification, data encryption, data compression, and/or apply other suitable transformation to communications based on a global policy, a client or system identifier, or another trigger. In some embodiments particularly well-suited to a cloud environment, the API 104 may enforce a security policy. Cloud environments may restrict client commands based on a permission set associated with a client and described in the security policy. The API 104 may verify that communications, particularly commands but also data and other communications, between the client 102 and the system 100 are permissible based on the security policy. In an embodiment, the security policy directs the API 104 to reject certain client communications. In an embodiment, the security policy directs the API 104 to apply one of a number of possible translations to a client command based on the client's permission set. In an embodiment, the security policy directs the API 104 to encrypt communications between the client 102 and the system 100. In some embodiments, the API 104 contains and manages the security policy directly. Conversely, the security policy may be maintained, at least in part, on a separate security policy master. In one embodiment, the API 104, the policy master, and/or the security policy is used to provide a US eAuthentication-compatible federated authentication system to achieve access controls and limits based on traditional operational roles. In a further embodiment, the implementation of an auditing API provides the necessary environment to receive a certification under FIPS 199 Moderate classification for a hybrid cloud environment.

Referring still to FIG. 1, the API 104 is in communication with the database cluster 106. The cluster 106 is a set of one or more database nodes 108 (of which nodes 108a and 108b are examples). Each node 108 represents a computing resource capable of storing and manipulating at least a part of the dataset. Nodes 108 may represent computing hardware such as processors, storage devices, and/or network interfaces and may also represent virtualized instances of computing hardware. In a cloud environment, nodes 108 having virtualized hardware are especially common. For instance, a single enterprise-class processor may be presented as a dozen or more virtual processors utilized in a multitude of nodes 108. Virtualization and other techniques can also combine hardware into a unified virtual construct. For example, multiple storage devices may be presented as a single unified storage device. Particularly in, but not limited to, environments with rapid dynamic resource allocation, a complex relationship between physical resources, virtual resources, and nodes 108 emerges. In various embodiments, nodes 108 comprise any number and/or any portion of any type of resource, both real and virtual.

In the course of receiving a client command, the API 104 forwards the command and any associated data to one or more of the nodes 108. In an embodiment, the API 104 communicates with the node 108 directly. A coordinating node 108, for example node 108a, receives and processes the client command. If the target data is within the node's dataset, the node 108a may perform the transaction. Otherwise, the command is propagated to the appropriate node 108. In some examples, the coordinating node 108a acts as a proxy for other nodes if the target data is not within the node's dataset. That is to say, the coordinating node 108a forwards the command to the target node, for example node 108b, for processing. Any response is then transmitted from the target node 108b back to the API 104 through the coordinating node 108a. In the alternative, the coordinating node 108a may hand off the command to the target node 108b and task the target node 108b with transmitting any reply to the API 104.

In some embodiments, any node 108 may receive commands from a requestor, such as the API 104, and thereby act as a coordinating node. This may be referred to as "server symmetry" or a "cluster of peers." In other embodiments, one or more nodes 108 are hidden from direct access and cannot receive commands from, for example, a client 102. In embodiments with multiple potential coordinating nodes 108, determining a coordinating node 108 may turn on an attribute of the node 108, an attribute of the data stored within the node 108, an attribute of the network, and/or other suitable criteria. For example, a coordinating node 108 may be selected based, in part, on the node's processing power. In another example, a coordinating node 108 is selected based, in part, on the access frequency of data stored within the node. In some applications, it may be advantageous to select a coordinating node 108 that is infrequently accessed for load balancing purposes, or it may be advantageous to select a coordinating node 108 that is frequently accessed to increase the chance that the target data will be stored within the node. In another example, a coordinating node 108 is selected based, in part, on the network latency between the node 108 and the requestor. In a further example, the coordinating node 108 is selected based, in part, on some other node metric such as the scheduled maintenance of another node 108.

In some embodiments, the API 104 does not communicated directly with the nodes 108. In one such embodiment, a separate computing resource referred to as the load balancer 110 receives the client command from the API 104, determines a target node 108 and/or a coordinating node 108, and acts as a proxy for communications with the cluster 106. As with the nodes 108, the load balancer 110 may contain any combination of virtual and physical computing resources including processing resources, storage resources, I/O resources, and network resources. The exact allocation of resources may vary dynamically according to workload, performance, network load, and/or other metrics. In many embodiments, the load balancer 110 relieves the nodes of compute burdens including data filtering, target resolution, and/or acting as a proxy and thereby improves cluster response time.

Each database protocol may utilize slightly different terminology to express certain underlying concepts. Exemplary systems will be examined in detail to illustrate the concepts therein. From these examples, equivalent concepts and terms can be recognized in other database architectures. Thus in the interest of conciseness, embodiments will be described utilizing generic terms for concepts that may be applied to any relevant architecture.

Cassandra™, a trademark of Apache Software Foundation, is one such distributed database system. Cassandra™ stores data in units called columns. Each column is a tuple, a list of associated data elements. The basic column format can be represented as (name, value, timestamp). For brevity, the timestamp, while an essential element of the column, is often not written. Thus, an example column may be written (User-Name, User_1). An optional level of hierarchy called a super column may incorporate any number of columns. Moving up a level, keys (sometimes referred to as rows) are tuples consisting of a name and one or more columns or super columns. An example key may be written (Status_Key, (UserName, User_1), (Logged_In, Y). Any number of keys may be grouped into a column family. Analogously, a group of column families is referred to as the keyspace, the final level of hierarchy. A pseudocode representation of the relationship could be constructed as:

[keyspace] [column family] [key] [column]

or optionally:

[keyspace] [column family] [key] [super column] [column]

Figure 2:
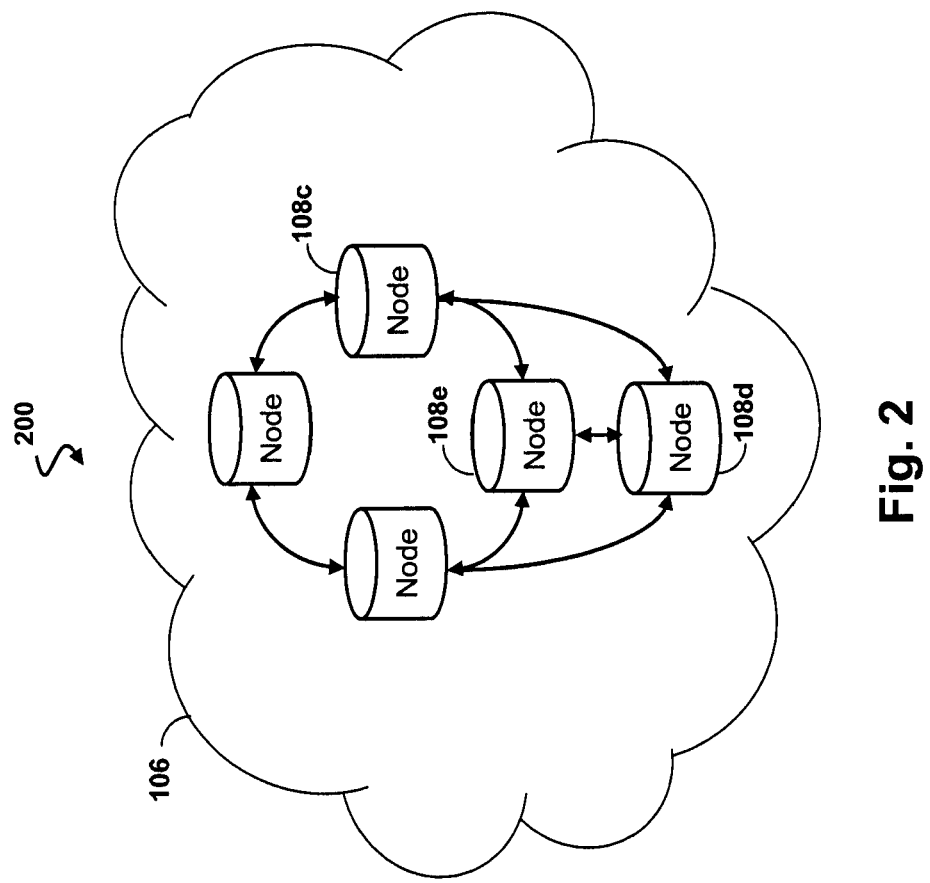
FIG. 2 is a schematic diagram illustrating a portion of a distributed database architecture according to aspects of the present disclosure.

FIG. 2 is a schematic diagram illustrating a portion of a distributed database architecture 200 according to aspects of the present disclosure. To distribute the data within the keyspace over a set of nodes 108, Cassandra™ supports both partitioning and replication. Partitioning divides data among multiple nodes, whereas replication duplicates data between two or more nodes. To partition the keyspace, Cassandra™ allocates a key range to each of the nodes 108 within the cluster based on a node token. For example, node 108*c* may be assigned a range from [100, 200). Data within the keyspace is sorted by key, and each node 108 is assigned data under the keys within the node's range. The relationship of the nodes 108 is often conceptualized as a ring. The keys could be said to exist in a range that extends over the circumference of the ring where the maximum key value "wraps around" on the minimum.

The particular allocation of keys may be determined by an allocation algorithm with two common algorithms being RandomPartitioner (RP) and OrderPreservingPartitioner (OPP). RandomPartitioner does not allocate data by keys directly, and instead utilizes an MD5 hash of the key to assign a hexadecimal number to each key. Each node 108 on the ring has an associated numerical range based on a node token. For example, if node 108*c* is associated with a range of [100, 200), then data stored under keys with an MD5 hash between these two values will be assigned to node 108*c*. In contrast, OrderPreservingPartitioner and other ordering partitioners utilize a sequential ordering of the key names, such as alphanumeric under OPP. Under an OPP algorithm, node 108*c* may be associated with a range of [b, d). Data stored under a key with a name that falls within the range is assigned to the respective node 108*c*. Because of the ring structure, another node 108 can be added under either algorithm with minimal adjustment to the ranges of the other nodes 108. One method for adding a node 108 assigns half of the keys associated with the busiest existing node 108 to the new node 108. This only requires modifying the range of one existing node, i.e. the busiest node 108.

Another form of data distribution is replication. Replication creates nearly identical data sets on multiple nodes. Referring to FIG. 2, node 108*d* is a replica of node 108*e*. Replication allows node 108*d* to assume some of the load of node 108*e*. Unlike some other architectures, Cassandra™ does not utilize a primary or master replica. Each node 108 remains a peer of all other nodes 108. For writes, the write command is sent to all replicas (in the illustrated cluster 106 both nodes 108*d* and 108*e*). However, not all nodes 108 need to respond with an acknowledgement in order for the write to be successful. Based on the configuration of the cluster 106, a success at as few as one of the replicated nodes 108 will suffice. Nodes that were not successful are updated and made consistent later as resources allow. For reads, the requestor may have the option to select the consistency level of the data within the read request command. In other words, the requestor may elect to accept the data provided by first node 108 to respond, or may request that the coordinating node 108 verify the data against other replicated nodes 108. If the data conflicts, the latest data is provide to the requestor and nodes 108 with older data are updated. This is referred to as a read repair process.

MongoDB®, a registered trademark of 10gen, Inc., is also a distributed database system. The basic data element in MongoDB® is a document. A document is an ordered list of one or more key/value pairs. A simple document might be represented as (UserName:User_1, Logged_In:Y). Unlike a column, a document can contain any number of elements, the elements being key/value pairs. In contrast to the fixed four or five levels of hierarchy utilized by Cassandra™, MongoDB® provides more flexible data structures. Levels of hierarchy are created by embedding a document within the value field of a key/value pair of a parent document. Traversing the hierarchy upwards, top-level documents are incorporated into collections. Collections may be divided into sub-collections of documents, but this is not required. At the highest level of hierarchy, the collections are grouped into a database, which is roughly analogous to a keyspace in Cassandra™. Thus, a pseudocode representation of a MongoDB® database may be as simple as:

[database] [collection] [document]

or may be more complicated, such as:

[database] [collection] [sub-collection] [document] [document] . . . [document]

Figure 3:
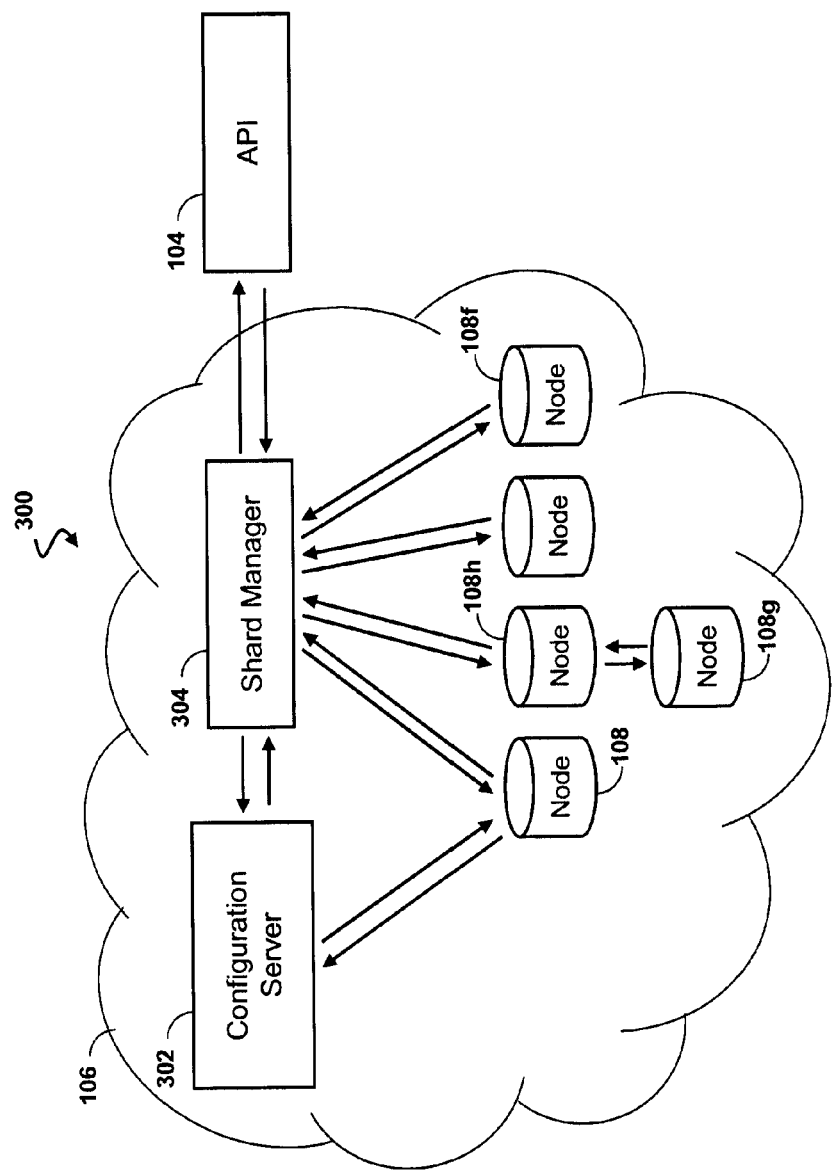
FIG. 3 is a schematic diagram illustrating a portion of another distributed database architecture according to aspects of the present disclosure.

FIG. 3 is a schematic diagram illustrating a portion of another distributed database architecture 300 according to aspects of the present disclosure. MongoDB® also supports both data partitioning and replication. Data partitioning among nodes is handled by a process referred to as sharding. In a sharded implementation, data is allocated among the nodes 108 within the cluster 106 based on a shard key. The administrator of the cluster 106 selects a key value of the documents within a collection to serve as the shard key. For example, documents within a collection may have a key "UserName" that can be selected as the shard key. Each node 108 is assigned a range of key values. However, in contrast to Cassandra™, the key range for a node 108 does not have to be contiguous. A node 108*f* may have a key range of [b,d) and [n,p). A configuration server 302 tracks the key ranges of the nodes 108. Instead of a peer network and a ring arrangement, a shard manager 304 (commonly referred to as the mongos system or device) receives database access commands from a requestor, such as the API 104, and queries the shard configuration servers 302 to determine the target node 108. The shard manager 304 may also forward any node reply to the requestor. One skilled in the art will recognize that the shard manager 304 and/or each of the configuration servers 302 may be implemented using may any combination of virtual and physical computing resources including processing resources, storage resources, I/O resources, and network resources.

Still referring to FIG. 3, node 108*g* is a replica of node 108*h*. Under one common replication scheme, master/slave replication, one of the nodes 108, for example node 108*h*, is designated the master node. Only the master node can receive data writes directly. This ensures that the master node has a current and coherent data set. Slave nodes do not receive write requests directly from the clients and may be hidden meaning that they do not receive read commands. In other implementations, clients will be able to read directly from slave nodes. A recent alternative to master/slave replication is a replica set. This type of replication changes how a master node (in this configuration referred to as a primary node) and slave nodes (here referred to as secondary nodes) are determined, yet with respect to most read and write handling, replica set implementations closely resemble master/slave systems.

Figure 4:
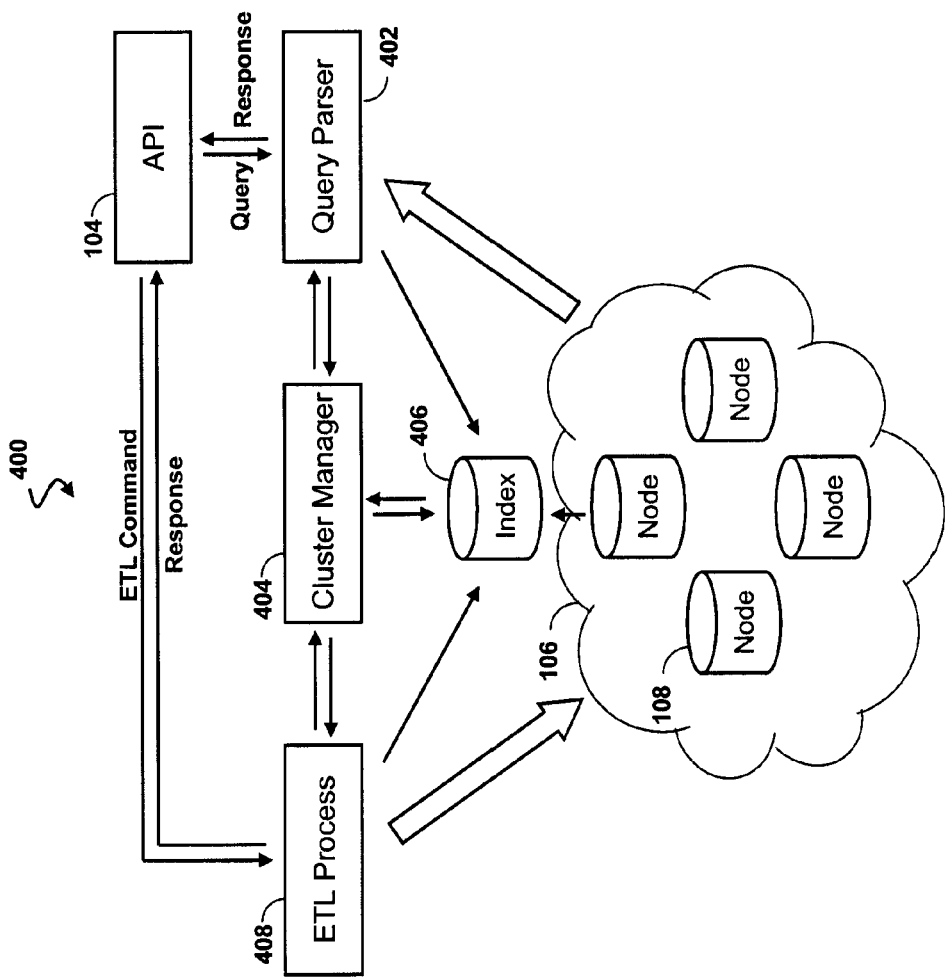
FIG. 4 is a schematic diagram illustrating a data warehouse database system according to aspects of the present disclosure.

From these examples, several general concepts emerge which may be applied to other database protocols and implementations. FIG. 4 is a schematic diagram illustrating a data warehouse database system 400 according to aspects of the present disclosure. The system includes a dataset distributed over a number of nodes 108 within a cluster 106. The nodes may be organized according to any suitable database protocol, including Cassandra™ and MongoDB®, as well as HBase™ (a trademark of Apache Software Foundation), CouchDB™ (a trademark of Apache Software Foundation), Riak® (a trademark of Basho Technologies, Inc.), and other suitable protocols.

As one example of a typical process that may attempt to perform a database read, the system 400 includes a query parser 402. The query parser 402 receives query commands and initiates data gathering tasks based on the commands. In this way, the query parser 402 provides another layer of abstraction, insulating the requestor (here the API 104) from the particular implementation of the database cluster 106. The query commands received by the query parser 402 may include client commands received by an API 104 as well as query commands from other sources. In various embodiments, the query parser 402 creates one or more data gathering tasks by translating a query command into an instruction set consistent with the database architecture of the cluster 106. In some such embodiments, translating a query command includes translating expressions (including regular expression, Boolean expressions, natural language queries, and other expression) within the query command. In an embodiment, the query parser uses default values for fields or parameters not specified by the query command. In a further embodiment, the query parser 402 performs a semantic validation of the query command as part of structuring the data gathering tasks. This may include database reference resolving (determining whether requested data exists within the dataset). Validation may include verifying that data types match between the query command and the target data. Validation may also include determining whether the issuer of the query command has permission to access the target data. In an embodiment utilizing a security policy to determine the issuer's permissions, the security policy is maintained at least in part on a separate security policy master. In an embodiment, once the query command has been decomposed into data gathering tasks and validated if necessary, the query parser 402 executes the data gathering tasks.

These tasks commonly involve reading data from the database cluster 106. In order for the query parser 402 to extract the data from the distributed nodes 108 within the cluster 106, the query parser 402 requests a connection from the cluster manager 404. The cluster manager 404 refers to the cluster index 406 and determines the configuration of the nodes 108. The configuration is then analyzed based on one or more criteria to create a connection list. In some embodiments, the connection request from the query parser 402 provides the cluster manager 404 with information about the underlying query task. In some such embodiments, the cluster manager 404 structures the connection list based, at least in part, on the nature of the query. For example, in response to a query task that seeks to retrieve data stored under a specific key, the cluster manager 404 may compare the specified key with the key ranges of the nodes 108 and list the node having the strongest association with the specified key. The strongest association may mean that the node contains the data or that the node is a designated proxy for the data holder. In an embodiment, a connecting node is listed based, at least in part, on an attribute of the node 108 such as performance, available resources, workload, the node's visibility status, and/or other node attributes. In another embodiment, the connecting node is provided based, at least in part on, an attribute of the data such as frequency of access, coherency, data integrity, data age, access permissions, and/or other data attributes. In yet another embodiment, a connecting node is selected based on a combination of an attribute of the query, an attribute of a node 108, and/or an attribute of a node's dataset.

The cluster manager 404 may provide the assembled connection list to the query parser 402 and allow the query parser 402 to establish the connections directly. In other embodiments, a designated proxy resource, which may be the cluster manager 404, establishes communications based on the connection list and relays commands between the query parser 402 and the designated nodes 108. In some embodiments, the connection list contains more than one node 108, in which case the nodes 108 are accessed sequentially, in parallel, in combination, and/or in the alternative. Based on the connection list, the query parser 402 is connected either directly or through an intermediary to the listed nodes 108. In some embodiments, especially those utilizing a cluster of peer nodes 108, one or more of the specified nodes may be a coordinating node 108 that acts as a proxy for other nodes 108 within the cluster. In such embodiments, the coordinating node 108 routes data between the target node 108 and the query parser 402.

After the node or nodes 108 have attempted to retrieve the requested data, one or more responses are passed back to the query parser 402. A response may include the requested data and may also include status indicators and/or ancillary data such as the time of the last update to the data. The parser 402 receives the response and may perform additional translation, modification, and/or verification steps before forwarding it to provider of the query instruction. In an embodiment, such as one employing read repair processes, the query parser 402 instructs a node 108 to update its dataset based on the data contained within a response. In various embodiments, the parser 402 aggregates data within a response set, filters data within the response set, verifies that the returned data's type and format match the query, verifies that the returned data is within the client's permission level, performs other suitable alteration, and/or performs some combination thereof. In an embodiment, the parser 402 translates the response into a response set recognized and supported by the API 104 to be passed on to the client 102. In an embodiment, the parser 402 forwards the response set to another computing process or computing resource such as an Extract, Transform, and Load process.

By utilizing the cluster manager 404 to determine the coordinating node or nodes 108, the query parser 402 achieves a certain degree of insulation from the particular node arrangement and architecture and from the distribution of data throughout the cluster 106. From the parser's perspective, an access or connection point is provided, via a known proxy, a connection list, or another mechanism, and from this, query responses can be expected without further consideration of the cluster topography. In some applications, this allows the query parser to be migrated to remarkably different database environments without modification.

The system 400 may also include an Extract, Transform, and Load (ETL) process 408. The ETL process 408 exemplifies a set of processes that may attempt to write data to the cluster 106. The ETL process 408 receives a variety of ETL commands, for example client write commands, from sources including the API 104. A typical flow for executing an ETL command by the ETL process 408 involves building an index of data to be extracted, extracting data, validating the extracted data, performing one or more transformations to the extracted data, staging the transformed data for writing, creating an audit log, loading (writing the staged data to the cluster 106), and removing transient data structures. For the purposes of this disclosure, method used by the ETL process to write data to the cluster 106 will be explored in detail.

Prior to writing to the cluster 106, the ETL process 408 requests a connection from the cluster manager 404. As disclosed in the context of the query parser 402, the cluster manager 404 utilizes the cluster index 406 to determine the configuration of the nodes 108. The cluster manager 404 may compile a connection list based on the node configuration, as well as on any combination of request attributes, node attributes, and data attributes. As with query reads, the ETL process may supply the cluster manager 404 with information about the data to be written. For example, a key value for the data may be specified. In this example, a connecting node may be included in the list based, at least in part, on the key being within a node's key range. In an embodiment, the connecting node 108 is listed based, at least in part, on an attribute of the node 108 such as performance, available resources, workload, the node's visibility status, the node being a designated master or slave, and/or other node attributes. In another embodiment, the connecting node is listed based, at least in part on, an attribute of the data such as frequency of access, coherency, data integrity, data age, access permissions, and/or other data attributes. In some embodiments, the cluster manager 404 provides the ETL process 408 with a list containing more than one node 108, in which case the nodes 108 may be accessed in sequentially, parallel, in combination, and/or in the alternative.

Connections are established between the ETL process 408 and one or more nodes 108 based on the connection list created by the cluster manager 404. In the illustrated embodiment, the ETL process 408 connects to the nodes 108 directly. However in alternate embodiments, the cluster manager 404 or another designated proxy may forward instructions to the nodes 108. Designated proxies may include peer nodes 108 acting as coordinating nodes for a target node. In such embodiments, the coordinating node 108 routes data between the target node 108 and the ETL process 408. Upon completion of the database write (whether successful or unsuccessful), a target node 108 may send the ETL process 408 a reply that may include a confirmation flag. In an embodiment, the ETL process utilizes one or more replies to generate a status response. The status response is then sent to the ETL command initiator. As it does for read processes, the cluster manager 404 insulates the ETL process 408 from the particular node arrangement and from the particular distribution of data throughout the cluster 106.

There are numerous advantages to the database system 400 in addition to the aforementioned benefits of providing a simplified interface between read and write processes and the cluster 106. The cluster manager 404 provides an additional level of abstraction between the cluster 106 and data processes. This abstraction allows the cluster 106 to be reconfigured without disrupting reads and writes. These changes to the cluster 106 can include adding additional resources, rebalancing existing resources, and/or accommodating failing resources. A secondary node may be promoted to a primary node, or a hidden node may be made readable. In some embodiments, the cluster manager 404 supports more extensive changes to the cluster topography such as moving from a single node 108 implementation to a distributed cluster 106 without modifying read and write processes. Another significant advantage of this particular system 400 is the ability to add additional clusters 106 as the dataset evolves. The strength of cloud-computing architectures lies in the rapid rebalancing of system resources. The value of a dynamically scalable database that accommodates changes to the cluster topography without requiring modifications to the processes accessing the cluster cannot be overstated.

The cluster manager 404 also allows data to be distributed among the nodes in a manner different from the scheme supported by the database protocol. If a hypothetical Cassandra™-type database protocol distributes data according to key values, the cluster manager 404 can further split data at the column level. For example, a first node may be assigned a subset of columns under a key and a second node may be assigned a second subset of columns under the same key. In this example, the cluster manager 404 determines from the underlying read or write request whether to add the first node 108, the second node 108, or both to the connection list based on the column range in the request. To the database software implemented on the node 108, it may appear that the node 108 stores a complete set of column data under the key. In this way, the node 108 can be said to be "unaware" that the key has been split. There are many potential benefits to providing this additional level of control for data distribution. In some embodiments, the database protocol imposes a maximum data size or number of entries that may be stored on a node 108. Thus, a more flexible distribution system allows for larger data sets. In some embodiments, a number of smaller nodes are quicker to replicate and synchronize than an equivalent large node. In some embodiments, a high-traffic key has high-traffic columns and low-traffic columns. By isolating the high-traffic columns, the frequently accessed data can be replicated without replicating low-traffic data. This avoids wasting resources by duplicating infrequently accessed data and instead directs resources where they may be most useful.

Figure 5:
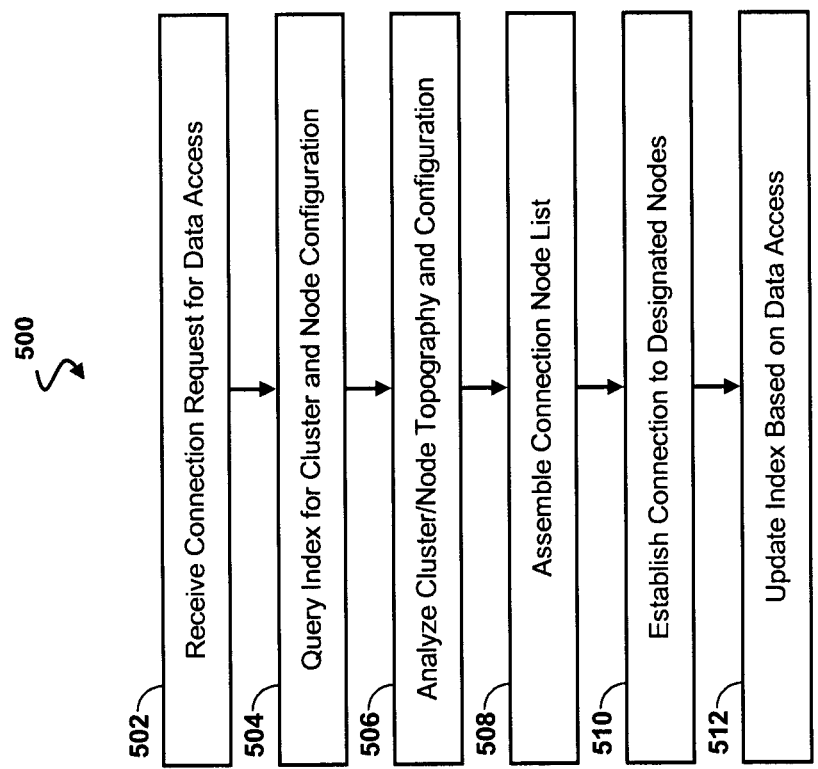
FIG. 5 is a flow diagram of a method for requesting a database connection according to aspects of the present disclosure.

FIG. 5 is a flow diagram of a method 500 for requesting a database connection according to aspects of the present disclosure. The method is well suited for implementation on a number of database systems including database system 400 of FIG. 4. Additional steps can be provided before, during, and after the method 500, and some of the steps described can be replaced or eliminated for other embodiments of the method. Additionally, some steps may be performed concurrently with other steps. In block 502, a connection request is received. The connection request may be generated from a read and/or write command and may contain information about the underlying data access command such as a database destination to be read or written. In an example utilizing a Cassandra™-type database protocol for both the data cluster and the index, a read request is received to read columns under [Keyspace_1][Column_Family_1][Key_1]. In block 504, the index 406 is queried for information pertaining to the cluster and node configuration. In the current example, the index 406 organized by a combination of keyspace name and column family name. This selection is arbitrary, and it is understood that other examples organize the index 406 in alternate arrangements. Continuing the example, the index database is queried using the key "Keyspace_1:Column_Family_1." This returns a list of columns of the form (Name, Value) where Name is a key within the column family and Value is the node containing data stored under the key. In the present example, the query of the index database returns (Key_1, Node_5), (Key_2, Node_10). The query results are then analyzed to determine the node containing data under the search key "Key_1."

In block 506, the particular configuration and topography of the nodes within the cluster are analyzed. In the example, it is determined that Node_6 is a proxy for Node_5. In block 508, a connection list is assembled based on such factors as the cluster topography, the resources allocated to the nodes, the configuration of the nodes, the cluster workload, the attributes of the underlying access command, the nature of the data set, and/or other relevant criteria. In the example, Node_6 is added to the connection list as a proxy for Node_5, which contains the target data. In block 510, a connection is established between the requesting process and the designated node or nodes. In an embodiment, the requesting process connects directly to one or more designated nodes. In a further embodiment, an intermediary such as a proxy is utilized to relay commands between the nodes and the requesting process. In block 512, the index 406 is updated if necessary. In some embodiments, the node 108 or the requestor updates the index directly. In some embodiments, the node 108 or the requestor instructs the cluster manager 404 to update the index.

Another example demonstrates how the method 500 can be used to parse a read request that is not supported by the database protocol. In this example, a read request attempts to query data using a lower level of hierarchy than the database protocol supports. A read request is received to read Col_A→Col_G under [Keyspace_1][Column_Family_1][Key_1]. In this example, the database protocol does not allow queries on a subset of columns within a key. However, the system and index 406 can be structured to allow such queries. In response to the read request, the index 406 is queried using the key "Keyspace_1:Column_Family_1." This returns a list of columns of the form (Name, Value) where Name is a key and column range and value is the node containing data stored under the key and column range. In the example, the query of the index database returns (Key_1_Cols_A_thru_D, Node_15), (Key_1_Cols_E_thru_K, Node_20), (Key_1_Cols_L_thru_Z, Node_25). When the index results are analyzed, it is determined that the requestor need only query nodes 15 and 20. These nodes are included in the connection lists. This eliminates an unnecessary query of node 25. Culling unnecessary queries improves request response time, reduces load on the database cluster, reduces network load, and reduces load on the requestor. Limiting the query to relevant nodes may also reduce the amount of data that must be filtered or analyzed. This, in turn, may reduce the resources that need to be allocated to the requestor. For these and other reasons, the method 500 provides numerous advantages over traditional distributed database management methods.

Figure 6:
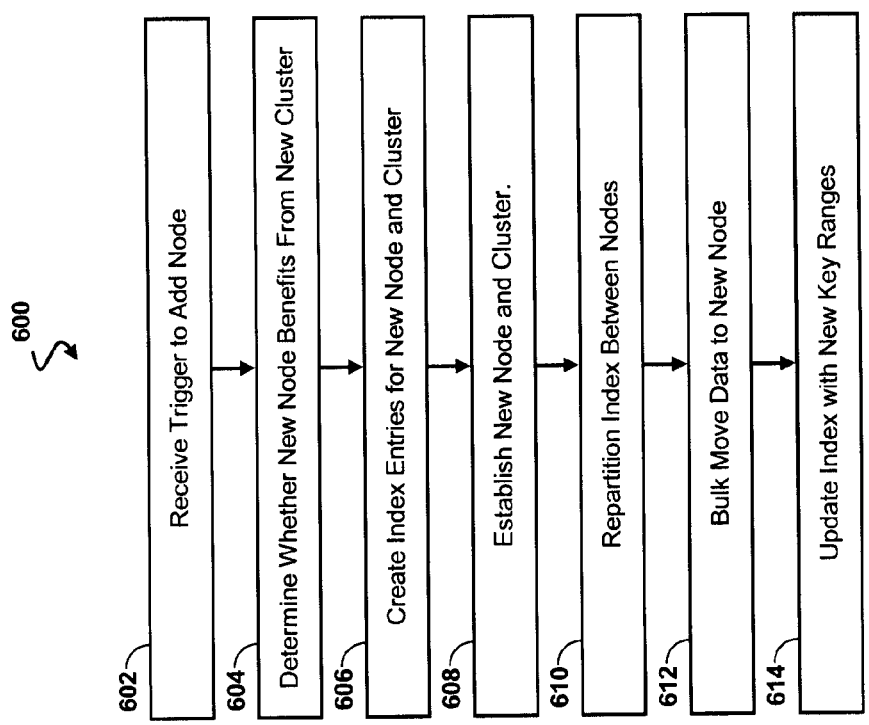
FIG. 6 is a flow diagram of a method for adding a cluster to database system according to aspects of the present disclosure.

FIG. 6 is a flow diagram of a method 600 for adding a cluster to database system according to aspects of the present disclosure. The method is well suited for implementation on a number of systems including database system 400. Additional steps can be provided before, during, and after the method 600, and some of the steps described can be replaced or eliminated for other embodiments of the method. Additionally, some steps may be performed concurrently with other steps. In block 602, a trigger is received to add a node to the existing system. A number of triggers may indicate that new node should be created. The dataset size may suggest that a node should be added. The amount of data or number of entries on a particular node may indicate the need for a new node. Commonly, excessive workload on a node will trigger a response. Particularly in a cloud environment, resources assigned to a completely unrelated system or task may free up, thereby allowing their reallocation. Other embodiments respond to additional triggers. In block 604, it is determined that the new node benefits from being placed in a new cluster. For example, the database protocol may specify a maximum number of nodes per cluster. If the existing cluster or clusters have reached the maximum number of nodes, the new node may require a new cluster. In other examples, the database protocol may specify a maximum data size, either in kilobytes or in database entries per cluster. Additionally, a performance analysis of the system may indicate that the added node would be best utilized in a new cluster. In block 606, new entries in the index are created for the new node and cluster. In some embodiments, a new cluster begins as a single node cluster. In some embodiments, the new cluster is populated with nodes from other clusters. In one such embodiment, nodes in other clusters are analyzed to determine if relocating the nodes to the new cluster conveys potential performance benefits. In block 608, the new node and cluster are established and added to the system. In block 610, the index is repartitioned between the new and existing nodes. In block 612, data is moved to the new node based on the node's key range. In block 614, the index is updated to reflect the new configuration.

Figure 7:
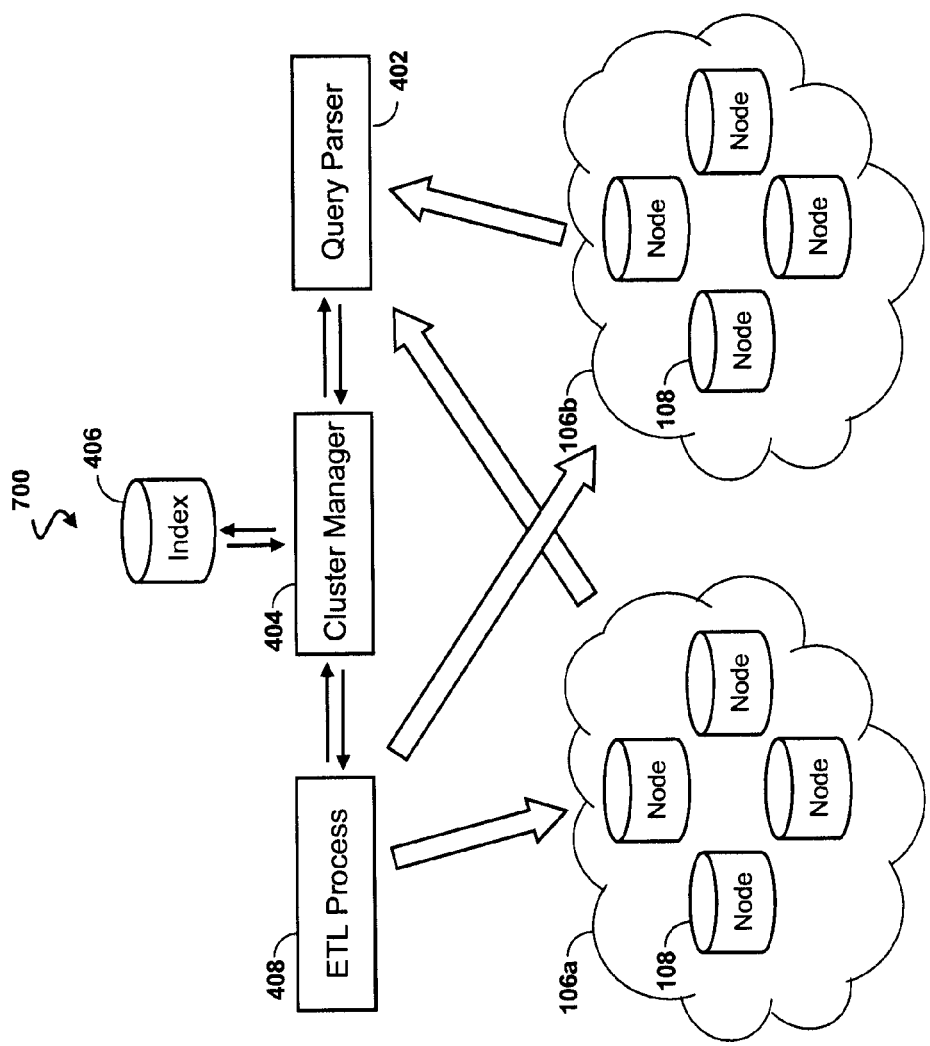
FIG. 7 is a schematic diagram illustrating a data warehouse database system incorporating multiple database clusters according to aspects of the present disclosure.

FIG. 7 is a schematic diagram illustrating a data warehouse database system 700 incorporating multiple database clusters according to aspects of the present disclosure. The system 700 is similar to the system 400 of FIG. 4 in certain respects. According, similar features in FIG. 7 are identified by the same reference numerals for clarity and simplicity. In this way, FIG. 7 has been simplified to better convey the inventive concepts of the present disclosure. For clarity, the system 700 includes two database clusters 106a and 106b. Additional embodiments include three or more database clusters and do not depart from the spirit and scope of this disclosure. In an embodiment, the clusters 106a and 106b have identical topographies. In some embodiments, the clusters 106a and 106b differ in number of nodes, in distribution of node resources, and/or in other characteristics. For example, in an embodiment, the cluster 106a is a single-node cluster, and the cluster 106b is a multi-node cluster. A single dataset (whether expressed as a keyspace, database, or other term) is divided between the two database clusters 106a and 106b. The division creates two complete and conforming sub-datasets. In other words, each sub-dataset meets the requirements of the cluster protocol for being an independent dataset. For example, a ring-based protocol such as Cassandra™ may require a complete and contiguous key range to be distributed among the nodes within a cluster such as [a→0 wrapping back to a). Thus, the protocol may require the nodes 108 of cluster 106a to have the full key range and the nodes 108 of cluster 106b to have the full key range as well. In such an implementation, it is the data that is divided between the clusters, not the key range. For example, a node in a first cluster 106a may represent itself within the cluster as having a key range of [a→k), and a node in a second cluster 106b may represent itself within the cluster as having the same key range. This ensures that the complete key range is present in both clusters as required by the protocol. To divide data within the shared range, instead of looking solely at the key range reported by the nodes, the cluster manager 404 refers to the index to determine which node receives a data request and then specifies the appropriate node by including it on the connection list. The complete and conforming nature of the data on any one cluster 106 allows the clusters 106 to operate independently. In an embodiment, this allows the clusters 106 to be "unaware" of other clusters 106 within the system 700.

The system 700 includes a query parser 402 as an example of a process that may initiate reads to the dataset. To perform a read, the query parser 402 requests a connection list from the cluster manager 404. The cluster manager 404 refers to the cluster index 406 and determines the configuration of the nodes 108. In the illustrated embodiment, the index 406 contains configuration data on both clusters 106a and 106b. Based in part on the index 406, as well as other criteria such as attributes of the query task, of the nodes 108, of the dataset, and/or other suitable attributes or criteria, the cluster manager 404 returns a connection list to the query parser 402. In configurations having multiple clusters, the connection list may specify one or more nodes, and/or may specify one or more clusters. In an embodiment, the connection list includes nodes 108 within both cluster 106a and cluster 106b. The query parser 402 then utilizes the connection list provided by the cluster manager 404 to establish the specified connections, either directly or through a proxy. In an exemplary embodiment where the connection list includes a cluster but not a node, the query parser 402 selects and connects to a node within the cluster according to a procedure established in the database protocol. Once the connection is established, the execution of the read request is performed substantially similar to that of system 400. In some embodiments, the procedures for requesting a connection and executing a read request are the same for single-cluster system 400 and multiple-cluster system 700. In one such example, a single query parser 402 is used in both a single-cluster system 400 and a multiple-cluster system 700.

The system 700 also includes an ETL process 408 as an example of a process that may initiate writes to the dataset. Similar to the query parser 402, the ETL process 408 requests a connection list from the cluster manager 404 in response to an ETL command. The cluster manager queries the index 406, analyzes the topography of the associated data clusters 106, and assembles a connection list containing a combination of nodes 108 and clusters 106. The ETL process 408 utilizes the connection list to form the specified connections. In an embodiment, the execution of the ETL command is performed substantially similar to that described with referenced to single-cluster system 400. In some embodiments, the procedures for requesting a connection and executing an ETL command are the same for single-cluster system 400 and multiple-cluster system 700. In one such example, an ETL process 408 is used in both a single-cluster system 400 and a multiple-cluster system 700.

As can be seen, in some embodiments, both read and write processes may establish connections to database based on the identity of the node 108 and regardless of the cluster 106. Moreover, coordination is not required between the clusters. Because of this, the operation of the query parser 402, the ETL process, and the nodes 108 need not depend on any particular cluster structure, nor do those elements even need to be aware of additional clusters. Instead, in such embodiments, the index 406 performs the bulk of the cluster management. This can be seen in an example. In one example, the clusters utilize a protocol similar to Cassandra™. A query task attempts to perform a read of data stored under the key "UserName." A first node belonging to cluster 106a has a key range of [T,V), and a second node belonging to cluster 106b has an overlapping key range of [R,Z). However in the example, data under "UserName" is only stored within the node of cluster 106a. In the simplest implementation, the cluster manager 404 will provide a list with both the first and second nodes, and the query parser 402 will attempt to query both. The query to the node of cluster 106a will return the data requested, whereas the query to the node of cluster 106b will fail or return nothing. However, a more optimized implementation will utilize the index 406 to store cluster identifiers for particular keys. For example, the index 406 may store a name-value pair of (UserName, cluster 106a). The cluster manager 400 may then use this data to assemble a connection list including cluster 106a.

A system 700 incorporating multiple database clusters 106 offers several advantages. A protocol may have a maximum number of nodes in a cluster, thus providing multiple clusters allows the system 700 to incorporate additional nodes beyond the maximum. In some embodiments, the computing resources may render it more efficient to group data into clusters 106. For example, data that is frequently accessed together, such as data stored under related keys, may be grouped in the same cluster 106. Alternately, in some environments, it may be more efficiently to divide data that is frequently accessed together across clusters 106 in order to parallelize transactions. Another advantage is additional distribution granularity. As stated previously, each database protocol has a level of hierarchy used to divide data between nodes 108. For example, in Cassandra™, data may be distributed based on key. One notable advantage of the system 700 is that the index 406 may be structured to distribute data based on an alternate hierarchy level, such as a column or super column. Even in a cloud environment, resources do not always scale effortlessly. Supporting a large node may require grouping resources that are not located in physical proximity, that have a less-than-optimal interconnection, that are of a different type, or that have other unsatisfactory characteristics. A large node is slower to replicate, which may lead to problems with auto-scaling, data synchronization, data backup, and fault recovery. For these and other reasons, a data set that exceeds the optimal node size may be more efficient if divided between multiple nodes. Thus, in an embodiment, a key corresponding to a large number of columns and therefore a large amount of data is split between nodes based on a column identifier.

Figure 8:
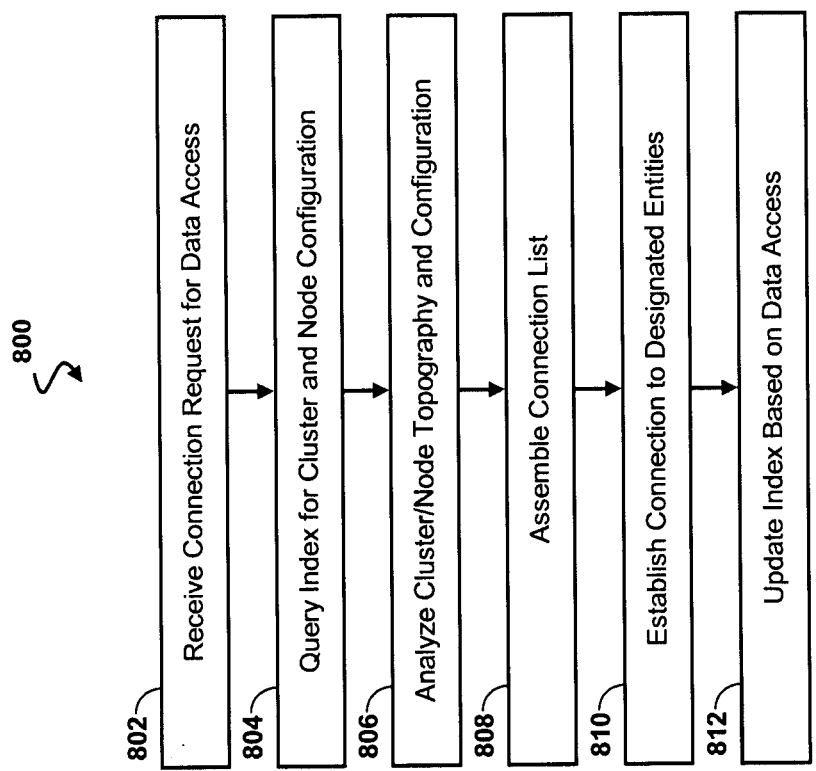
FIG. 8 is a flow diagram of a method for database access according to aspects of the present disclosure.

FIG. 8 is a flow diagram of a method 800 for database access according to aspects of the present disclosure. The method is suitable for implementation on a number of database systems including database system 700 of FIG. 7. Additional steps can be provided before, during, and after the method 800, and some of the steps described can be replaced or eliminated for other embodiments of the method. Additionally, some steps may be performed concurrently with other steps. In block 802, a connection request is received. The connection request may be generated from a read and/or write command and may contain information about the underlying data access command such as a database destination to be read or written. In block 804, the index is queried for information pertaining to the cluster and node configuration.

In block 806, the configuration and topography of the clusters and nodes are analyzed. In block 808, a connection list is assembled based on such factors as the cluster topography, the resources allocated to the nodes, the configuration of the nodes, the cluster workload, the attributes of the underlying access command, the nature of the data set and/or other relevant criteria. The connection list may specify any combination of nodes and/or clusters. In block 810, a connection is established between the process issuing the connection request and the designated nodes 108 and/or clusters 106. In an embodiment, the requesting process connects directly to one or more designated nodes 108. In a further embodiment, an intermediary such as a proxy is utilized to relay commands between the nodes 108 and the requesting process. In block 812, the index 406 is updated if necessary. For example, a write may add a new key to a dataset, or may remove a key from the dataset. In some embodiments, the node 108 or the requestor updates the index directly. In some embodiments, the node 108 or the requestor instructs the cluster manager 404 to update the index.

In an example utilizing a Cassandra™-type database protocol for both the data cluster and the index, a read request is received to read data under [Keyspace_1][Column_Family_1][Key_1][Cols A→G]. The exemplary index is organized by keyspace and column family. It is understood that the organization of the index cluster is arbitrary. Other examples organize the index by other identifiers. The index is queried with the string "Keyspace_1:Column_Family_1." The query returns (Key_1_Cols_A_thru_D, Cluster_1), (Key_1_Cols_E_thru_K, Node_30), (Key_1_Cols_L_thru_Z, Node_35). Based on the query results, Cluster_1 and Node_30, which happens to be in a different cluster, are added to the connection list. The requesting process establishes the specified connections and executes the data access command.

Figure 9:
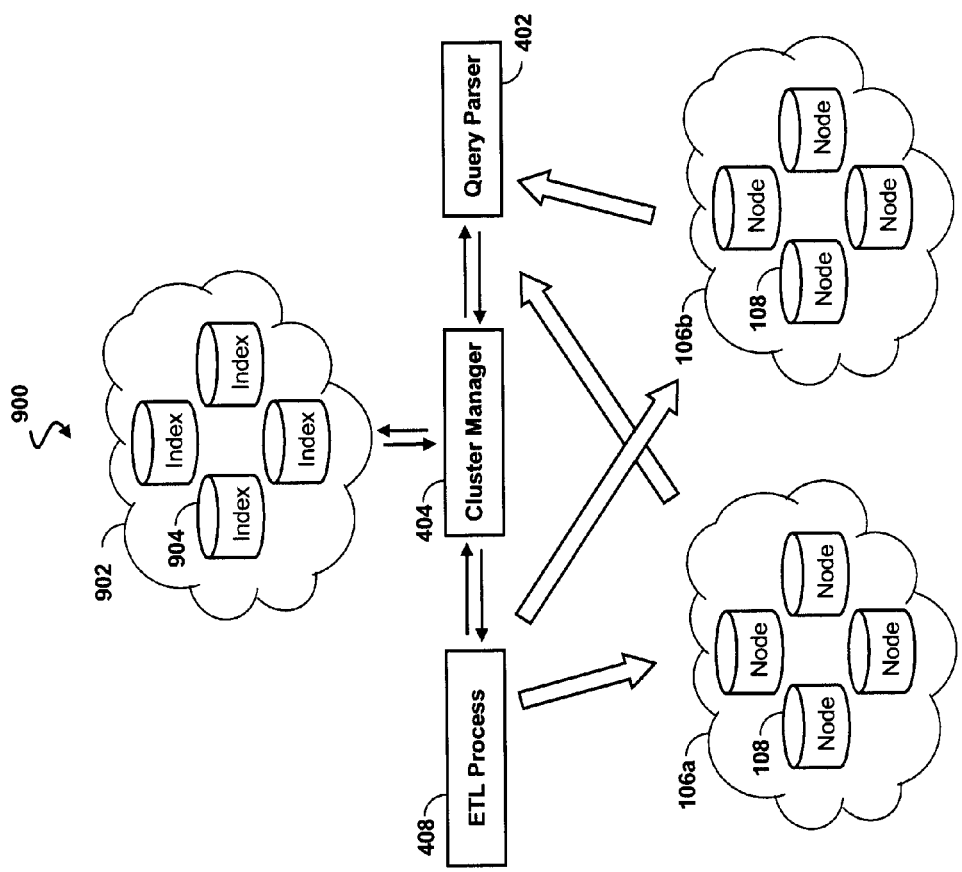
FIG. 9 is a schematic diagram illustrating a data warehouse database system incorporating a distributed index database cluster according to aspects of the present disclosure.

For clarity of presentation, the system 700 described with reference to FIG. 7 includes two clusters. It should be noted that the system 700 is in no way limited in the number of clusters. However, large data sets, such as those associated with large numbers of clusters, may lead to a situation where the index is not comfortably implemented on a single device. FIG. 9 is a schematic diagram illustrating a data warehouse database system 900 incorporating a distributed index database cluster 902. The system 900 is similar to the systems 400 and 700 of FIGS. 4 and 7 in certain respects. According, similar features in FIG. 9 are identified by the same reference numerals for clarity and simplicity. In this way, FIG. 9 has been simplified to better convey the inventive concepts of the present disclosure.

System 900 includes an index database cluster 902. The index cluster 902 is a set of one or more index database nodes 904. Each node 904 represents a computing resource capable of storing and manipulating at least a part of the index. Nodes 904 may represent computing hardware such as processors, storage devices, network interfaces, and/or other computing hardware and may also represent virtualized instances of computing hardware. In various embodiments, nodes 904 comprise any number and/or any portion of any type of resource, both real and virtual. In an embodiment, the index cluster 902 has a protocol and configuration similar to that of data clusters such as clusters 106a and 106b. In an alternate embodiment, the index cluster 902 utilizes a different database protocol from the data clusters 106. In various further embodiments, the index cluster 902 is architected in a manner designed to optimally provide cluster configuration data.

The system 900 includes read and write processes such as a query parser 402 and an ETL process 408 that request a connection to the data clusters from the cluster manager 404. In response, the cluster manager 404 queries the index cluster 902 to compile a connection list. To do so, the cluster manager 404 establishes communication with an index node 904. In an embodiment, the manager 404 communicates with the index node 904 directly. In an alternate embodiment, communications are relayed to the index node 904 via a proxy. The particular index node 904 may be a target node, and/or may be a coordinating node configured to forward the command to the target node. In an embodiment, the coordinating node acts as a proxy for the target node. The connected index node 904 provides the cluster manager 404 with a response that may include one or more data nodes and/or clusters. The response may also include status information and/or ancillary data such as a timestamp. From this response, the cluster manager 404 prepares a connection list. The requestor may be provided with the connection list allowing the requestor to establish the connections directly. Alternately, the requestor may utilize a proxy such as the cluster manager 404 to connect to the data clusters 106 and/or nodes 108 on the connection list. Once the connection or connections are established, the execution of the data access command may proceed substantially similar to that previously described.

Utilizing an index cluster 902 allows the system 900 to leverage the benefits of a distributed database. In an embodiment, the index cluster 902 reduces seek time over an alternative implementation. Utilizing an index cluster 902 may also reduce latency and improve network performance during index queries. In some embodiments, the index cluster 902 offers improved fault tolerance by such mechanisms as node replication. In an embodiment, the rapid resource allocation of a cloud environment allows node resources to be diverted from underutilized index nodes 904 to high-traffic nodes 904.

Figure 10:
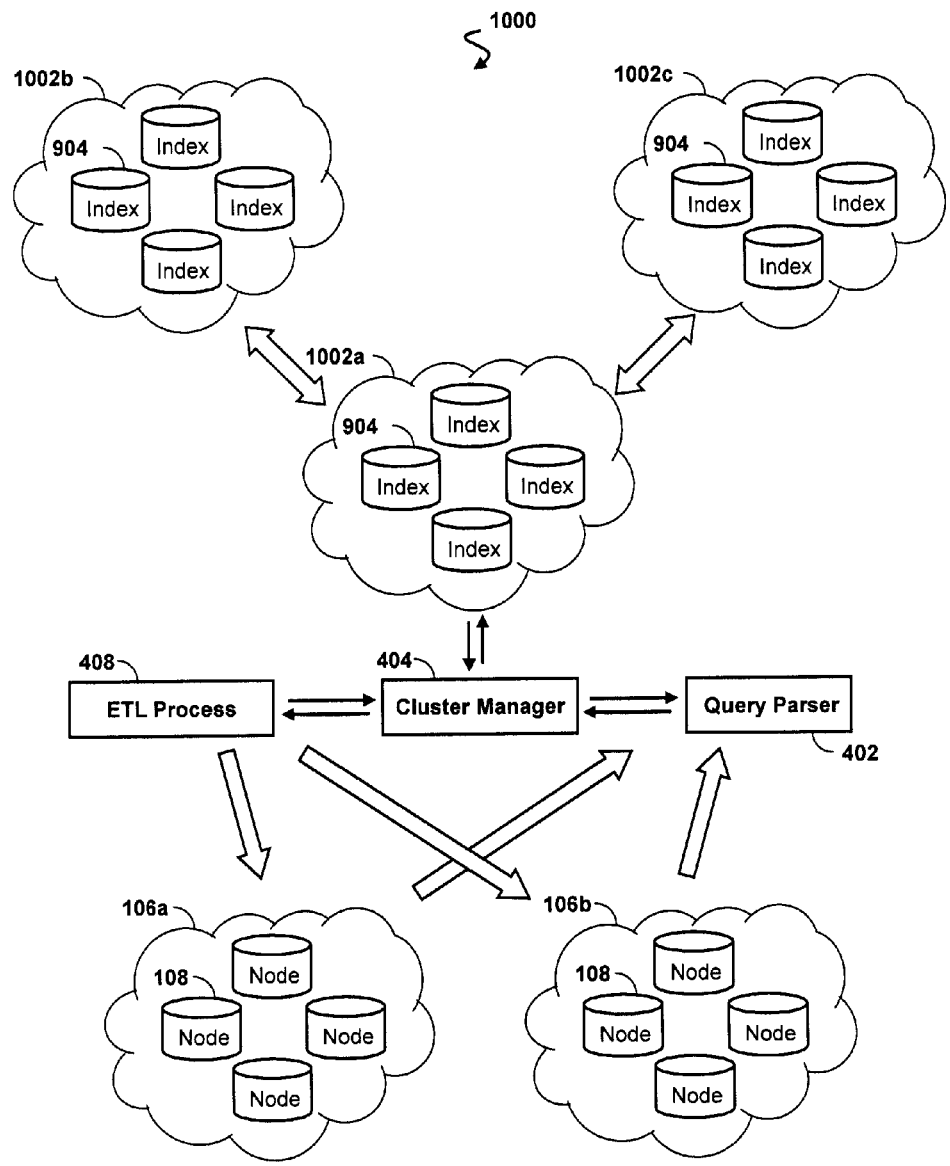
FIG. 10 is a schematic diagram illustrating a data warehouse database system incorporating a hierarchical index database configuration according to aspects of the present disclosure.

FIG. 10 is a schematic diagram illustrating a data warehouse database system 1000 incorporating a hierarchical index database configuration according to aspects of the present disclosure. The system 1000 is similar to system 900 of FIG. 9 in certain respects. According, similar features in FIG. 10 are identified by the same reference numerals for clarity and simplicity. In this way, FIG. 10 has been simplified to better convey the inventive concepts of the present disclosure. The system 1000 includes data cluster 106a and 106b and a cluster manager 404 similar to those of the system 700 of FIG. 7. The system 1000 also includes a query parser 402 and an ETL process 408 as exemplary processes that may attempt to read and write data to the data clusters 106a and 106b. These processes may be substantially similar to those of the system 400 of FIG. 4.

In some embodiments, the size and/or number of entries in an index database justify incorporating a hierarchical index database configuration. The system 1000 includes a plurality of hierarchical index clusters 1002 (of which clusters 1002a, 1002b, and 1002c are examples) containing a plurality of index nodes 904. In the illustrated embodiment, the system includes a first hierarchical level of index clusters (cluster 1002a), and a second hierarchical level of index clusters (clusters 1002b and 1002c). Other embodiments incorporate additional hierarchical levels. In an embodiment, the index clusters 1002a, 1002b, and 1002c have identical topographies. In some embodiments, the index clusters differ in number of index nodes, in distribution of index node resources, and/or in other characteristics. In an embodiment, the index clusters 1002a, 1002b, and 1002c utilize the same database protocol as the data clusters 106a and 106b. In various embodiments, the index clusters 1002 and data clusters 106 have different database protocols, node structures, architectures, configurations, and/or other attributes.

Index nodes 904 of each hierarchical level may contain configuration information for a data node 108 and/or cluster 106, and (with the exception of the final hierarchical level) may contain configuration information about a subsequent hierarchical level of the index. By definition, the final hierarchical level of the index only contains configuration information for data nodes 108 and/or data clusters 106. The designation "final" denotes nothing more than that a query of a final hierarchical level returns only data nodes 108 and/or data clusters 106. In the illustrated embodiment, the final hierarchical level of index clusters is the second hierarchical level containing clusters 1002b and 1002c. In other embodiments, the system 1000 includes one or more intermediate hierarchical levels between the first and final hierarchical levels.

Figure 11:
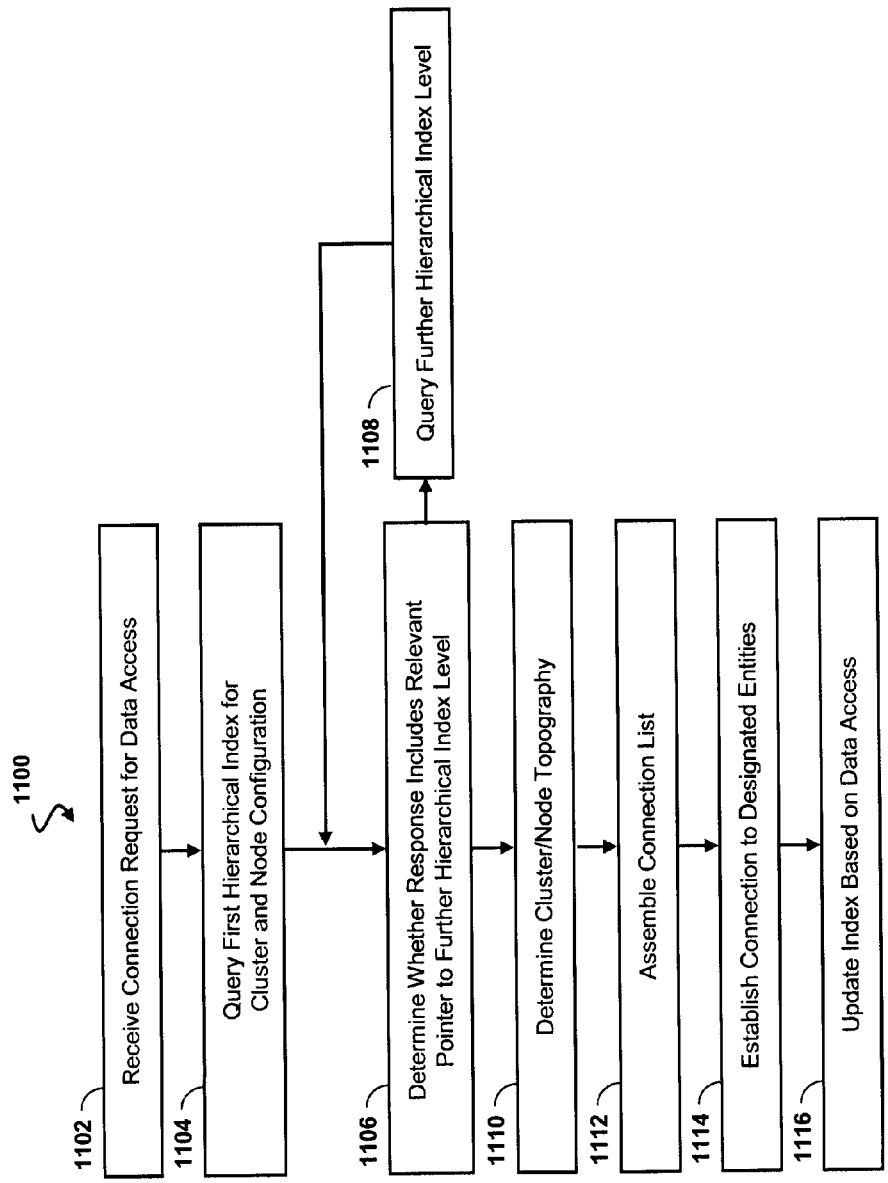
FIG. 11 is a flow diagram of a method for database access according to aspects of the present disclosure.

FIG. 11 is a flow diagram of a method 1100 for database access according to aspects of the present disclosure. The method is suitable for implementation on a number of database systems including database system 1000 of FIG. 10. Additional steps can be provided before, during, and after the method 1100, and some of the steps described can be replaced or eliminated for other embodiments of the method. Additionally, some steps may be performed concurrently with other steps. In block 1102, a connection request is received. The connection request may be generated from a read and/or write command and may contain information about the underlying data access command such as a database destination to be read or written. In block 1104, the first hierarchical index cluster is queried for information pertaining to the data cluster and node configuration. In block 1106, it is determined whether the query results contain a relevant pointer to a further location in the index. For example, the query results may refer to a subsequent hierarchical index level. If so, in block 1108, a query is run on the further index level. When the query results do not contain a relevant pointer to a further index location, the method 1100 proceeds to block 1110 where the configuration and topography of the data clusters 106 and data nodes 108 are analyzed. In block 1112, a connection list is assembled based on such factors as the cluster topography, the resources allocated to the nodes, the configuration of the nodes, the cluster workload, the attributes of the underlying access command, the nature of the data set and/or other relevant criteria. The connection list may specify any combination of data nodes 108 and/or data clusters 106. In block 1114, a connection is established between the process issuing the connection request and the designated nodes 108 and/or clusters 106. In an embodiment, the requesting process connects directly to one or more designated nodes utilizing the connection list. In a further embodiment, an intermediary such as a proxy relays commands between the nodes 108 and the requesting process. In block 1116, the index 406 is updated if necessary. For example, a write may add a new key to a dataset, or may remove a key from the dataset. In some embodiments, the data node 108 or the requestor updates the index directly. In some embodiments, the data node 108 or the requestor instructs the cluster manager 404 to update the index.

In an example of the method 1100 utilizing a Cassandra™-type database protocol for both the data clusters 106 and the index clusters 1002, a read request is received to read data under [Keyspace_1][Column_Family_1][Key_1][Cols A→G]. The first hierarchical index cluster is organized by keyspace, therefore, the index is queried with the string "Keyspace_1." It is understood that the organization of any hierarchical index cluster is arbitrary. Other examples organize a first hierarchical index cluster by other identifiers. The query returns (Column_Family_1_Keys_1_thru_5, Index_Cluster_5), (Column_Family_1_Keys_6_thru_99, Index_Cluster_10), (Column_Family_2, Data_Node_40). Based on the query results, the pointer to Index_Cluster 5 is relevant to the read request. Therefore, Index_Cluster 5 is queried. In the example, the second hierarchical index level is organized by keyspace and column family. In accordance with this particular implementation, the second hierarchical index level cluster Index_Cluster_5 is queried using the term "Keyspace_1:Column_Family_1." The query returns (Key_1_Cols_A_thru_D, Index_Cluster_7), (Key_1_Cols_E_thru_K, Node_51), (Key_1_Cols_L_thru_Z, Node_52). Because the read request seeks columns A thru G, the references to Index_Cluster_7 and Node_51 are both relevant to the read request. Therefore, Node_51 is added to the connection list and Index_Cluster_7 is queried. In the present example, Index_Cluster_7 is an nth-level hierarchical index cluster and is organized by keyspace, column family, and key. The query "Keyspace_1:Column_Family_1:Key_1" returns (Col_A, Node_54), (Cols_B_thru_D, Node_56). Based on this result, Node_54 and Node_56 are added to the Node_56 list. As the query does not provide any other relevant index locations, the connection list is provided to the requesting process or a proxy for establishing the specified connections. Once the connections to the data nodes 108 is established, the execution of the underlying data read command proceeds similar to that described previously.

One of skill in the art will recognize that the behavior of the query parser 402 and ETL process 408 of method 1100 and system 1000 is substantially similar to that of the query parser 402 and ETL process 408 described with respect to system 400 of FIG. 4, system 700 of FIG. 7, and system 900 of FIG. 9. It follows that, in an embodiment, a particular query parser 402 and ETL process 408 pair is utilized in a single-cluster system, a multiple-cluster system, a system incorporating a single-level hierarchical index cluster, and system incorporating a multiple-level hierarchical cluster.

The present disclosure describes multiple embodiments of a system and method for data management and indexing across a distributed database. In some exemplary embodiments, a database system is disclosed comprising: a cluster manager; an index; a first database cluster containing one or more database nodes including a first database node, the first database cluster configured to operate according to a first database protocol; and a data set distributed among the first database cluster; wherein the first database node reports a first data range within the first database cluster; wherein the index contains a second data range associated with the first database node, the second data range different from the first; wherein the cluster manager receives a request having a target data value from a requesting process, performs a query of the index in response to the request, and communicably directs the requesting process to access the first database cluster based on a determination that the target data value falls within the second data range. In some embodiments, the system further comprises a second database cluster containing one or more database nodes and configured to operate according to a second database protocol, wherein the data set is further distributed among the second database cluster. The first database cluster may be a complete and conforming independent cluster as specified by the first database protocol, and the second database cluster may also be a complete and conforming independent cluster as specified by the second database protocol. In some embodiments, the data set is structured to store data under a database hierarchy, the first database protocol supports distributing data at a set of hierarchy levels within database hierarchy, and the index is structured to distribute data at a level of the database hierarchy different from the hierarchy levels in the set supported by the first database protocol. In an exemplary embodiment, the index includes a first entry and a second entry, the first entry referencing the second entry, and the cluster manager performs a second query of the index in response to the first entry referencing the second entry. In some exemplary embodiments, the system further comprises an index cluster containing one or more index nodes, and the index is distributed among the index nodes. In some such embodiments, the index cluster is configured to operate according to an index database protocol different from the first database protocol. In some such embodiments, the system further comprises a second index cluster containing one or more index nodes, and the index is further distributed among the second index cluster. In one such embodiment, the index includes a first entry distributed among the first index cluster and a second entry distributed among the second cluster where the first entry references the second. The cluster manager then performs a second query of the index in response to the first entry referencing the second entry. In an exemplary embodiment, the first entry also references one or more of the first database cluster and the first database node.

In some exemplary embodiments, a method of establishing a connection to a database node is disclosed, the method comprising: receiving a connection request at a cluster manager from a requesting process; querying an index of a database system to receive a cluster and node configuration for the database system; determining a cluster/node topography for the database system based on the received cluster and node configuration; assembling a connection list based on the cluster/node topography of the database system; and connecting the requesting process to one or more of a specified database node and a specified database cluster based on the connection list. In some embodiments, querying of the index includes querying a first hierarchical level of the index for cluster and node configuration to receive a first index response, determining whether the first index response includes a relevant pointer to a second hierarchical level of the index, and querying the second hierarchical level when it is determined that the first index response includes the relevant pointer to the second hierarchical level. In one such exemplary embodiment, querying of the first hierarchical index includes performing a query command on a first index node in a first index cluster and querying of the second hierarchical index includes performing a query command on a second index node in a second index cluster. The first index cluster may be different from the second index cluster. In an exemplary embodiment, the connection request includes an attribute of an underlying data access command, querying of the index includes issuing a query command based on the attribute, and assembling of the connection list includes analyzing the cluster/node topography based on the attribute. In some embodiments, the assembling of the connection list includes analyzing the cluster/node topography based on at least one of an attribute of an underlying data access command, an attribute of a node, and an attribute of a dataset of a node. In an exemplary embodiment, the connection list includes a reference to the specified database cluster; and the method further comprising connecting the requesting process to a database node within the specified database cluster according to a procedure established in a database protocol of the specified database cluster.

In some exemplary embodiments, a method of adding a node to a distributed database system is disclosed, the method comprising: receiving a trigger to add a new node to a distributed database system; determining whether the distributed database system benefits from creating a new cluster; creating index entries for the new node and the new cluster when it is determined that the distributed database system benefits from the new cluster; establishing the new node and the new cluster as part of the distributed database system, the new node being established within the new cluster; repartitioning keys within an index; updating the index with the created index entries and the repartitioned keys. In some embodiments, the method further comprises moving data from an existing node to the new node. In an exemplary embodiment, the method further comprises determining whether an existing node benefits from being relocated from an existing cluster to the new cluster, relocating the existing node to the new cluster when it is determined that the existing node benefits from being relocated, repartitioning the key ranges of the existing cluster and the new cluster based on the relocating of the existing node to the new cluster, and updating the index with the repartitioned key ranges of the existing cluster and the new cluster.

In the above embodiments, the distributed database systems and methods offer fine-grained control over data distribution, the ability to handle large and complicated datasets, and flexible allocation of computing resources without disrupting processes attempting to access the data. However, no particular capability or advantage is associated with or required for any one particular embodiment. Although illustrative embodiments have been shown and described, a wide range of modification, change and substitution is contemplated in the foregoing disclosure, and, in some instances, some features of the embodiments may be employed without a corresponding use of other features. Accordingly, it is appropriate that the appended claims be construed broadly and in a manner consistent with the scope of the embodiments disclosed herein.

What is claimed is:

1. A database system comprising:
   one or more processors;
   a cluster manager, implemented on the one or more processors;
   an index;
   a first database cluster containing one or more database nodes including a first database node, the first database cluster configured to operate according to a first database protocol; and
   a data set distributed amongst the one or more database nodes of the first database cluster;
   wherein the first database node reports a first data range within the first database cluster;
   wherein the index contains a second data range associated with the first database node, the second data range different from the first data range;
   wherein, responsive to a received request having a target data value from a requesting process, the cluster manager performs a query of the index in response to the request, and communicably directs the requesting process to access the first database cluster based on a determination that the target data value falls within the second data range.

2. The database system of claim 1,
   the database system further comprising a second database cluster containing one or more database nodes and configured to operate according to a second database protocol;
   wherein the data set is further distributed among the second database cluster.

3. The database system of claim 2,
- wherein the first database cluster is a complete and conforming independent cluster as specified by the first database protocol; and
- wherein the second database cluster is a complete and conforming independent cluster as specified by the second database protocol.

4. The database system of claim 1,
- wherein the data set is structured to store data under a database hierarchy, the database hierarchy having a first set of levels;
- wherein the first database protocol supports distributing data at a set of hierarchy levels within the database hierarchy, wherein the set of hierarchy levels is a subset of the first set of levels; and
- wherein the index is structured to distribute data at a level of the database hierarchy not contained in the set of hierarchy levels.

5. The database system of claim 1,
- wherein the index includes a first entry and a second entry, the first entry referencing the second entry; and
- wherein the cluster manager performs a second query of the index in response to the first entry referencing the second entry.

6. The database system of claim 1, the database system further comprising an index cluster containing one or more index nodes, wherein the index is distributed among the one or more index nodes of the index cluster.

7. The database system of claim 6, wherein the index cluster is configured to operate according to an index database protocol different from the first database protocol.

8. The database system of claim 6,
- wherein the index cluster is a first index cluster;
- wherein the database system further comprises a second index cluster containing one or more index nodes; and
- wherein the index is further distributed among the one or more index nodes of the second index cluster.

9. The database system of claim 8,
- wherein the index includes a first entry distributed among the first index cluster and a second entry distributed among the second index cluster, the first entry referencing the second entry; and
- wherein the cluster manager performs a second query of the index in response to the first entry referencing the second entry.

10. The database system of claim 9,
- wherein the first entry further references one or more of the first database cluster and the first database node.

* * * * *